April 14, 1953  E. L. CLINE  2,634,830
APPARATUS AND METHOD FOR CONTROLLING DYNAMOMETERS, ETC
Filed July 26, 1946  4 Sheets-Sheet 1

Inventor
Edwin L. Cline
By Bacon + Thomas
Attorneys

April 14, 1953  E. L. CLINE  2,634,830
APPARATUS AND METHOD FOR CONTROLLING DYNAMOMETERS, ETC
Filed July 26, 1946  4 Sheets-Sheet 2

PERCENT OF MAXIMUM R.P.M.

Inventor
Edwin L. Cline
By Bacon & Thomas
Attorneys

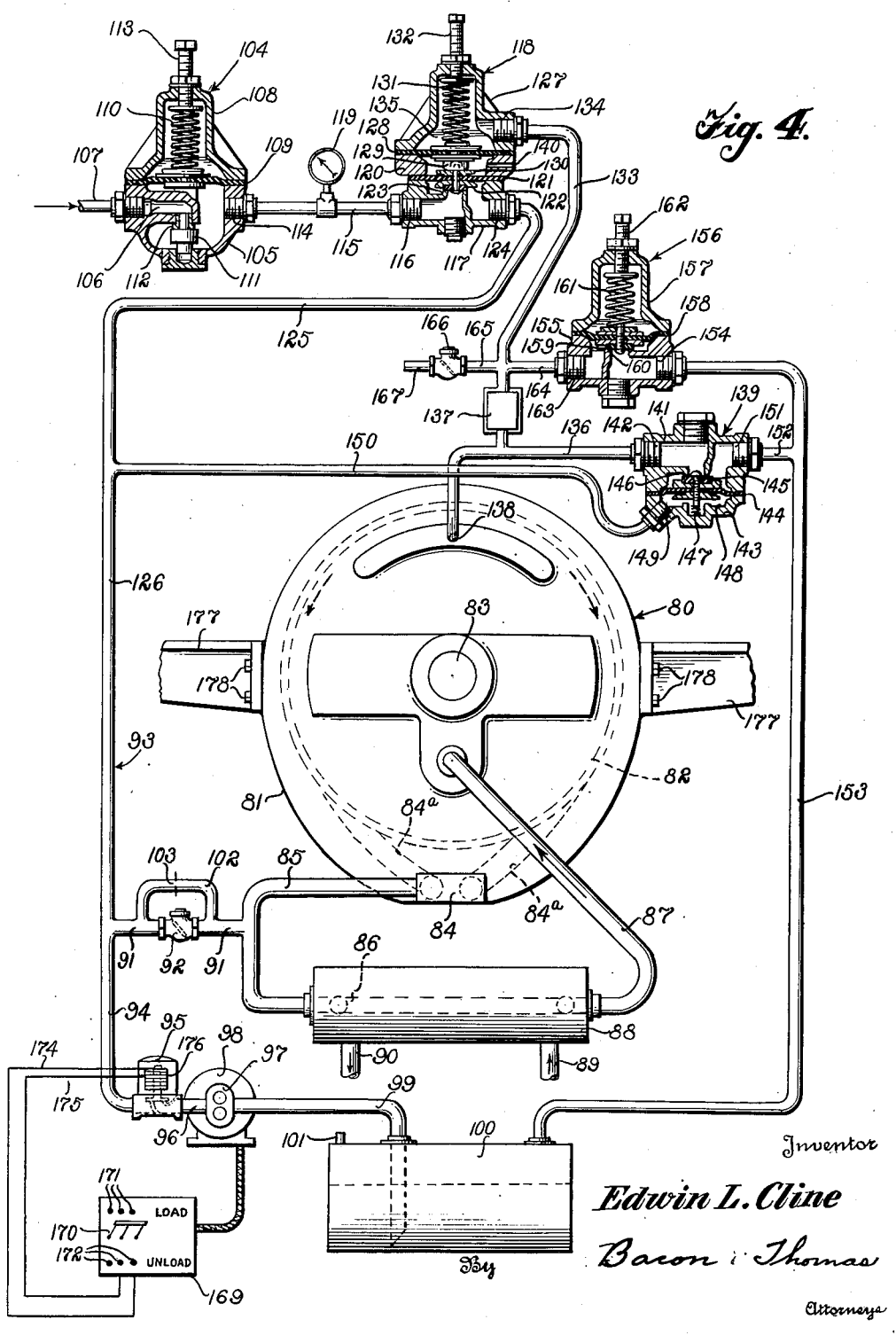

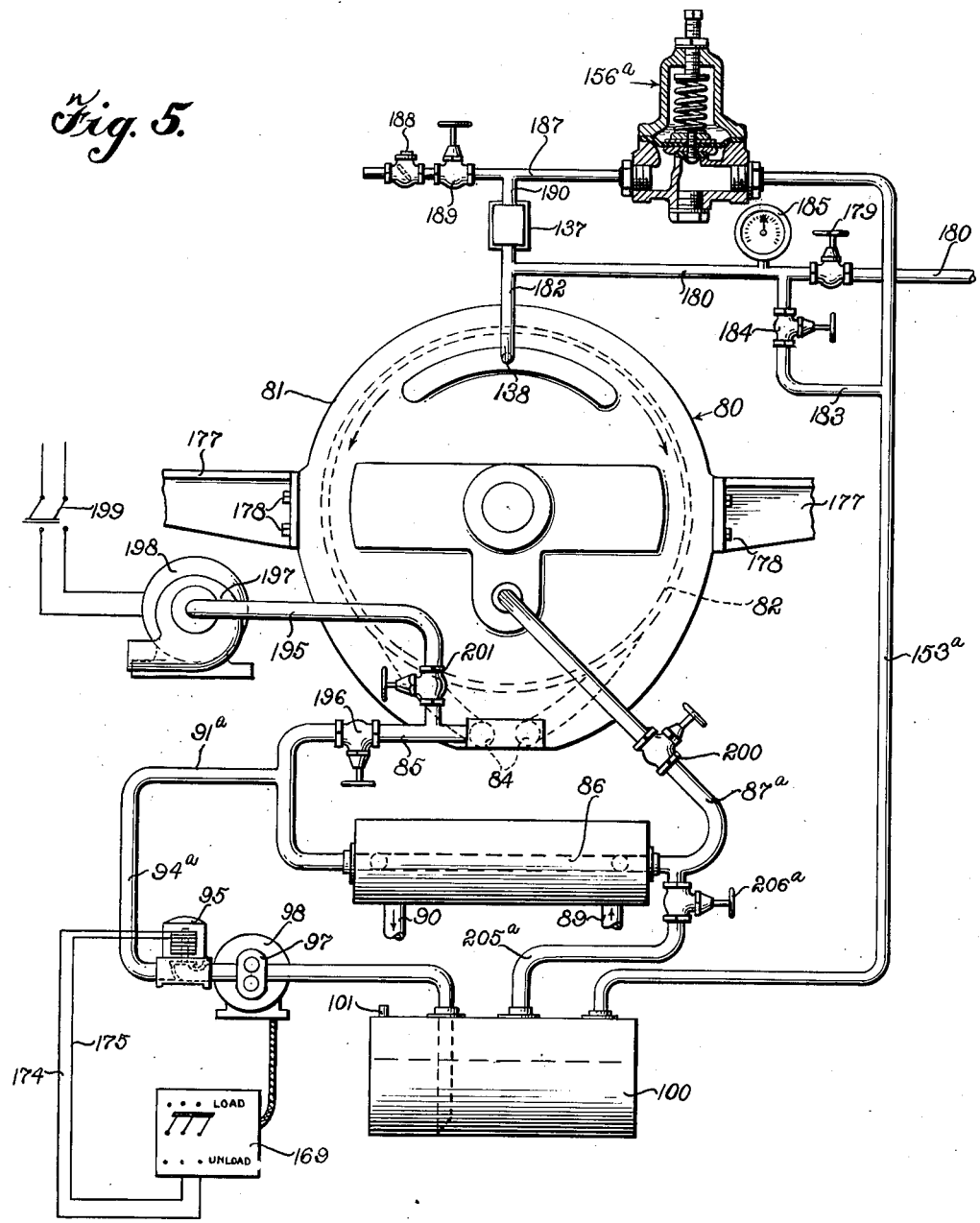

Patented Apr. 14, 1953

2,634,830

UNITED STATES PATENT OFFICE 2,634,830

APPARATUS AND METHOD FOR CONTROLLING DYNAMOMETERS, ETC.

Edwin L. Cline, Pasadena, Calif., assignor to Clayton Manufacturing Company, Alhambra, Calif., a corporation of California Application July 26, 1946, Serial No. 686,346

27 Claims. (Cl. 188—90)

The present invention relates to hydrodynamic devices such as are employed as dynamometers, brakes, fluid couplings, etc., and to a novel method and means for operating and stabilizing or controlling such devices under various load conditions.

The present invention is based upon the discovery that compressed air can be advantageously employed in hydraulically coupled devices to increase the useable operating range of a given device by overcoming hunting and surging under torque load, to decrease vibrations resulting from hydraulic forces created within the device itself, and for moving critical torque load control points out of a given required operating range of a hydraulic dynamometer to enable the use of said dynamometer for testing in that particular range.

More particularly, the invention relates to apparatus including a hydraulic brake or dynamometer and to a method contemplating the use of superatmospheric pressure alone, or in combination with brake liquid in the brake or dynamometer, or the use of subatmospheric pressure alone in the brake or dynamometer, for enabling said brake or dynamometer to be employed to absorb the power of a rotating shaft, or to test various prime movers, such as internal combustion engines, having a maximum horsepower falling within or below that of the limits of the normal range of said brake or dynamometer.

The principal object of my invention is to provide a method and means whereby hydraulically coupled apparatus can have its normal range of operating capacity extended to enable it to satisfactorily absorb, or transmit, power of a magnitude which it would normally be incapable of handling without hunting, surging or undue slipping.

An important object of the invention is to provide a method and means for overcoming critical torque load points in a hydraulic brake or dynamometer in order to enable prime movers to be tested in the ranges falling within said critical torque load points.

Another important object of the invention is to provide a method and means for decreasing vibrations in hydraulically coupled apparatus resulting from hydraulic forces built up within the apparatus itself.

Another object of the invention is to provide control apparatus for use with a given hydraulic power absorption device for adapting said device to test prime movers of a lower horsepower output than could normally be tested by said device.

Still another object of the invention is to provide a novel apparatus and method for increasing the range of torque absorption capacity of any given hydraulic dynamometer regardless of its normal operating range.

Another object of the invention is to provide means for introducing air (or any suitable gas) under superatmospheric pressure into the housing of a hydraulic brake, dynamometer, fluid coupling, etc., to increase the utility thereof.

Another object of the invention is to provide means for subjecting the interior of a brake or dynamometer housing to subatmospheric pressure to reduce the resistance to rotation of the rotor thereof to enable prime movers to be tested which are developing a horsepower below the lower limit of the range of the brake or dynamometer.

Another object of the invention is to provide automatic control means for varying the air pressure within a brake or dynamometer housing in accordance with variations in the pressure of the brake liquid in said housing.

A more specific object of the invention is to provide control means for gradually increasing the air pressure within a dynamometer or brake housing as the pressure of the brake liquid increases.

Another specific object of the invention is to provide control means for reducing the air pressure within a dynamometer as the pressure of the brake liquid decreases.

A further object of the invention is to provide means for utilizing a brake or dynamometer to absorb various torque loads without requiring the presence of brake liquid within the brake or dynamometer housing.

A further object of the invention is to provide automatic means for preventing the development of excessive air pressure within a hydraulic brake or dynamometer.

A still further object of the invention is to provide a hydraulic brake or dynamometer construction in which stability and freedom from hunting is automatically maintained by counteracting the pressure of the brake liquid (developed by rotation of the rotor) by air under superatmospheric pressure within the working circuit.

Other objects and advantages of the invention will be apparent from the following description taken in conjunction with the accompanying drawings, in which:

Fig. 4 is a diagrammatic view illustrating automatic means for maintaining stability of a hydraulic dynamometer by controlling the admission of air under superatmospheric pressure and the exhaust of such air from the dynamometer housing in accordance with the changes in load absorbed by the dynamometer;

Figure 1:
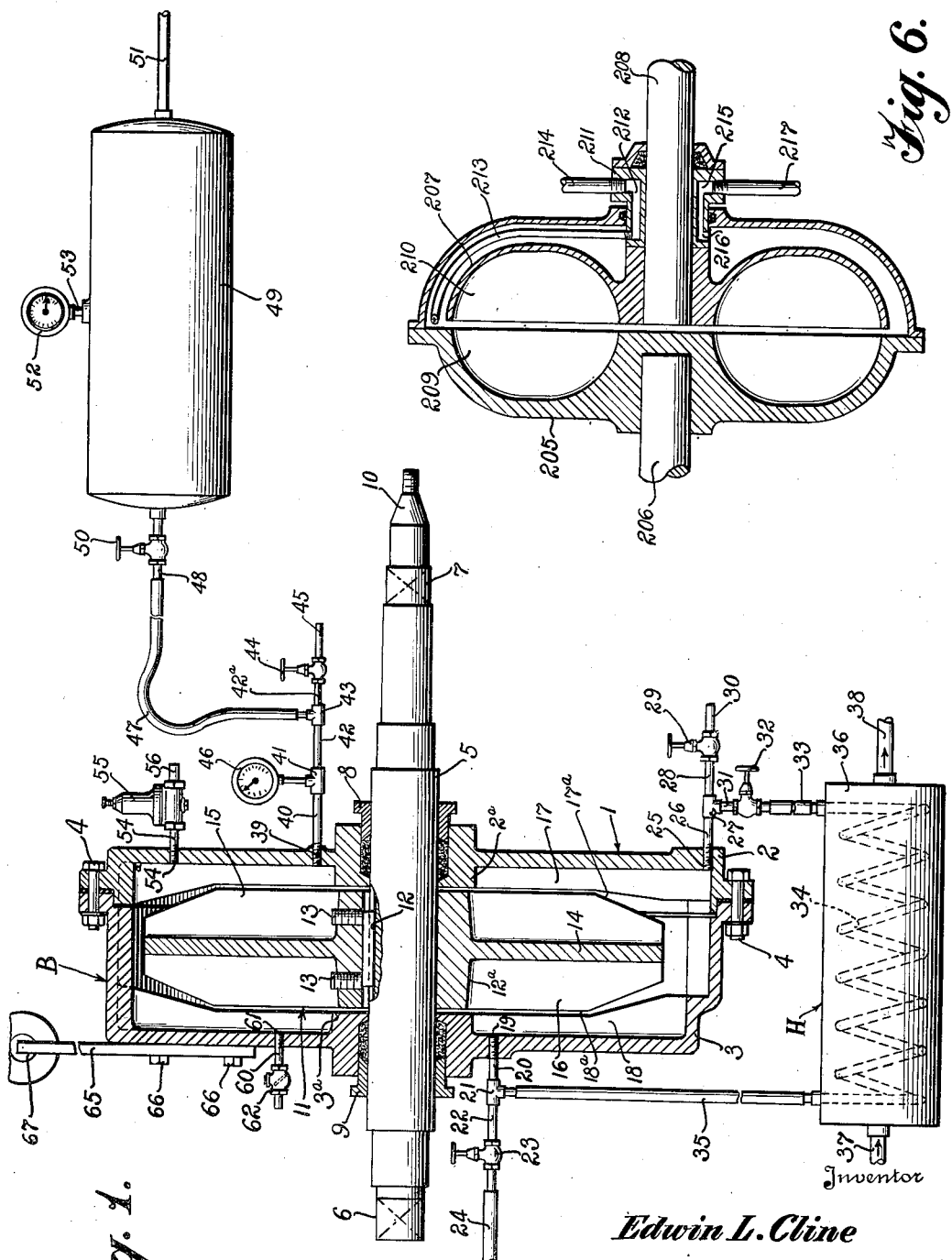
Fig. 1 is a diagrammatic view illustrating suitable, manually controlled apparatus for practicing the principles and the method comprising the present invention.

Fig. 5 is a diagrammatic view of a hydraulic dynamometer apparatus including means for preventing the creation of excessive air pressures within the dynamometer housing, for producing a subatmospheric condition within the dynamometer housing to reduce the resistance to rotation of the rotor when all of the liquid has been withdrawn from said housing, etc.; and Fig. 6 is a diagrammatic view of a fluid coupling including means for subjecting the fluid thereof to superatmospheric pressure.

Before describing the invention in detail, it is deemed desirable to point out that with the advent of more powerful internal combustion engines, such as airplane engines, boat engines, and tank engines developing anywhere from 2000 to 4000 horsepower, it became necessary to design and construct dynamometers, especially hydraulic dynamometers, of a rated capacity much higher than any previously employed in either repair shops or laboratories. From the standpoint of the users of such dynamometers, it is highly desirable to have "an ideal" dynamometer capable of testing engines of all sizes. In practice, however, the principles of dynamometer design are such that a brake unit designed to absorb 2000 to 4000 horsepower is of such large size that it is not adapted to satisfactorily test engines developing a comparatively low maximum horsepower, say 100 horsepower. As a matter of economy, and as a matter of necessity in some instances, there has been a demand for dynamometers that will accurately and efficiently test internal combustion engines of various rated horsepowers ranging anywhere, for example, from 100 horsepower to 4000 horsepower. Dynamometers capable of absorbing about 2000 to 4000 horsepower have been found to present what appeared to be insurmountable difficulties when attempts were made to use such dynamometers for testing engines developing a low maximum of 100 horsepower or less. The problem involved will be manifest when the fact is considered that, under atmospheric pressure, the air resistance to rotation of the rotor alone of a given 2000 to 4000 horsepower dynamometer creates a "windage" load sufficient to absorb about 60 horsepower. It becomes evident, therefore, that only a very small quantity of brake liquid need be introduced into the brake housing in order to raise the load absorption capacity to, say 80 or 100 horsepower. It was found by actual experience that, while the proper amount of liquid could be introduced into the brake housing to effect an absorption of all horsepower developed above the windage load, it was impossible to obtain steady and uniform speed and torque readings because the speed and torque indicators fluctuated to such an extent that no reliable test results could be obtained. The dynamometer was simply unstable.

As a possible explanation for the foregoing phenomena, it is suggested that the failure of large dynamometers to uniformly absorb very low horsepower is due to the failure of the small volume of brake liquid required to impose the load, to remain in its intended path or working circuit in the brake housing. My reasons, in support of such explanation, are fully set forth hereinafter.

Referring now to Fig. 1 of the drawings, the letter B generally indicates a hydraulic brake unit comprising a stator or housing 1 including sections 2 and 3 secured together by a plurality of circumferentially spaced bolts 4. A shaft 5 extends through the housing 1 and is supported at 6 and 7 in cradle bearings (not shown) in any conventional or suitable manner. Leakage of brake liquid from the housing 1 along the shaft 5 is prevented by stuffing boxes 8 and 9 arranged in hub portions $2^a$ and $3^a$, respectively. One end 10 of the shaft 5 is adapted to be connected with the prime mover (not shown) to be tested.

A rotor 11 is disposed within the housing or stator 1 and is secured to the shaft 5 by a key 12 held against displacement by set screws 13 passing through the hub $12^a$ of the rotor 11. The rotor 11 comprises a central disc-like web 14 and a series of radial vanes 15 disposed upon one side of said web and a series of radial vanes 16 disposed upon the opposite side of said web. The housing section 2 is provided with vanes 17 spaced by a gap $17^a$ from the vanes 15 on the rotor 11 and the housing section 3 is provided with vanes 18 spaced by a gap $18^a$ from the vanes 16 on said rotor. The arrangement and number of vanes and the construction of the brake unit as a whole may be varied as desired within sound design principles, inasmuch as the broad principles of this invention are applicable to any reasonably correctly designed hydraulic brake or dynamometer.

The housing section 3 has a threaded opening 19 adjacent the shaft 5, or low pressure zone of the housing 1, into which one end of a pipe nipple 20 is threaded. A pipe-T 21 has one end thereof connected to the pipe nipple 20 and its opposite end connected to a second pipe nipple 22, which in turn is connected with the outlet of a brake loading valve 23. The inlet of the valve 23 is connected to one end of a flexible hose or supply pipe 24. In the event that water is used as the brake liquid, the opposite end of the hose 24 will be connected with a suitable source of water supply under pressure.

The housing section 2 has a threaded opening 25 adjacent its periphery, or high pressure zone of the housing 1, and one end of a pipe nipple 26 is threaded into said opening. The opposite end of the pipe nipple 26 is connected to a pipe-T 27 and the other end of said pipe-T is connected with one end of a pipe nipple 28 whose opposite end in turn is connected with the inlet of a brake unloading valve 29. A pipe 30 has one end thereof threaded into the outlet of the valve 29 and its opposite end may be connected with a suitable drain (not shown), or discharge to the atmosphere.

It will be apparent from the foregoing, that the volume of water or other brake liquid in the brake housing 1 can be controlled by manipulating the brake loading valve 23 and/or the brake unloading valve 29.

In certain installations, I may connect the brake unit B with a heat exchanger H to provide a closed cooling and circulating system for the brake liquid. Thus, a pipe nipple 31 is connected at one end thereof to the stem of the pipe-T 27 and its opposite end is connected to the inlet of a circulation control valve 32. A section of hose 33 connects the outlet side of the valve 32 with one end of a heat exchanger coil 34, which is normally full of brake liquid. The opposite end of the coil 34 is connected by a section of return hose 35 with the stem of the pipe-T 21. The coil 34 is arranged in a casing 36 having an inlet 37 and an outlet 38 for cooling water. By virtue of the foregoing arrangement, with the valve 32 open and the valves 23 and 29 closed, a constant load may be maintained on the prime mover (not shown) being tested by the brake unit B due to the fact that any liquid displaced from the brake housing 1 and forced into the heat exchanger core 34 by the action of the rotor 11 results in the return of a like volume of liquid to the brake housing through the hose 35, it being apparent that whatever volume of water is forced into the heat exchanger coil 34 must be accompanied by the discharge of a corresponding volume from said coil. It will be further apparent that the rotor 11 acts like the impeller of a pump causing a forced circulation of the brake liquid through the heat exchanger H to effect cooling of the brake liquid. The rate of circulation can be varied by adjusting the valve 32, or the valve 32 can be completely closed if the cooling function of the heat exchanger H is not required for any reason.

The housing section 2 is provided with a second threaded opening 39 located adjacent the shaft 5. One end of a pipe nipple 40 is threaded into the opening 39 and its opposite end is connected with one end of a pipe-T 41. The opposite end of the pipe-T 41 is connected with one end of a second pipe nipple 42 and the opposite end of said pipe nipple is connected to a second pipe-T 43. A third pipe nipple 42a connects the pipe-T 43 with the inlet of an air exhaust control valve 44. A pipe 45 is connected at one end with the outlet side of the valve 44 and its other end is open to the atmosphere. An air pressure gauge 46 is connected with the stem of the pipe-T 41 and a length of flexible air hose 47 has one end thereof connected with the stem of the pipe-T 43 and its opposite end connected with a pipe 48 communicating with one end of a compressed air storage tank 49. An air supply control valve 50 is connected in the pipe 48. A pipe 51 mounted in the opposite end of the tank 49 is connected with an air compressor (not shown) or some other suitable source of supply of air under pressure. An air pressure gauge 52 is connected by a pipe nipple 53 with the air storage tank 49 to indicate the pressure of the air within said tank.

The housing section 2 has a third threaded opening 54a into which one end of a pipe nipple 54 is threaded. The opposite end of the pipe 54 is threaded into the inlet side of a conventional or suitable air pressure relief valve 55 and a vent pipe 56 is threaded into the outlet side of said valve. The valve 55 is adjustable to open at a desired pressure to prevent excessive air pressures from being developed in the housing 1 during loading of the brake. A pipe nipple 60 is threaded into an opening 61 in the housing section 3 and is connected with the outlet side of a conventional air check valve 62 arranged to automatically admit air into the housing 1 to prevent the formation of a vacuum condition therein when the valve 29 is open and liquid is being drained from said housing through the pipe 30.

A torque arm 65 has one end thereof connected with the housing section 3 by bolts 66 and the opposite end of said torque arm is operatively associated with an element 67 of a conventional or suitable torque indicating device. Inasmuch as the details of construction of the torque indicating device are not a part of the present invention, no detailed illustration or description thereof herein is deemed to be necessary.

Assuming that the shaft 5 has been connected with an engine to be tested, and that some brake liquid has been admitted into the housing 1 by opening the loading valve 23, it will be apparent that when the rotor 11 is in motion the liquid in the spaces between the vanes 15 and 16 will flow radially outwardly under centrifugal force and pass transversely across the portion of the gaps 17a and 18a, respectively, at the periphery of said rotor and enter the spaces between the stator vanes 17 and 18. Such liquid will then flow radially inwardly between the vanes 17 and 18 of the stator sections 2 and 3, respectively, until it reaches the inner portion of the spaces between said vanes adjacent the hub portions 2a and 3a and will then return across the gaps 17a and 18a in the spaces between the rotor vanes 15 and 16 adjacent the hub portion 12a. The liquid thus returned will then be forced outwardly under centrifugal force between the rotor vanes 15 and 16 and this same general cycle for any given drop of liquid will be repeated.

Figure 2:
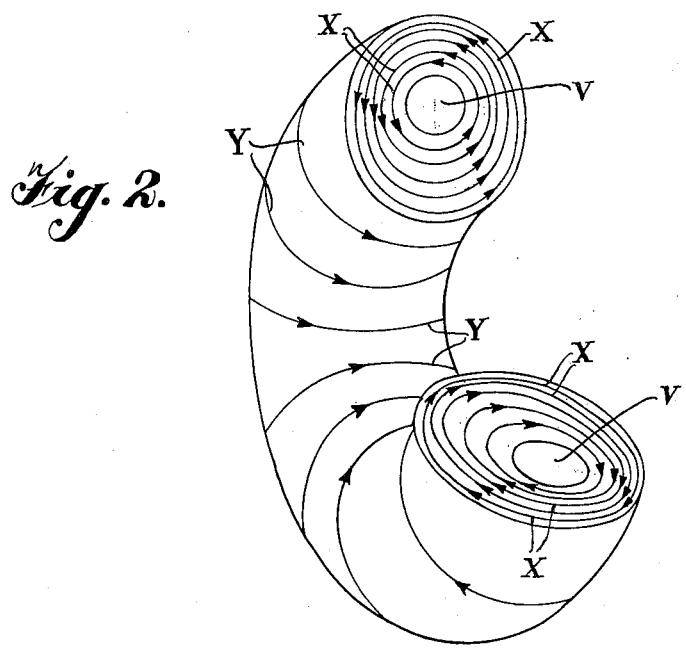
Fig. 2 is a view diagrammatically illustrating the theoretical working circuit of the fluid in the left side portion of the hydraulic brake shown in Fig. 1.

The liquid, during its flow toward the periphery of the rotor 11, absorbs kinetic energy and during its flow inwardly toward the center of the stator 1, gives up kinetic energy. The power transmitted by the shaft 5 to the rotor 11 is thus absorbed and converted into heat which is imparted to the brake liquid, with the torque reaction on the stator being exactly equal to the torque input through the shaft 5. In order to vary the torque load, or the power absorbed at a given speed, the volume of liquid in the working circuit of the dynamometer 1 can be varied by manipulation of the valves 23 and 29. As the volume of liquid within the dynamometer housing 1 is varied, the mass represented thereby will be accelerated and decelerated with a corresponding resultant change in the power absorbed. The mass of liquid within the brake housing 1 tends to travel through a given working path resembling a rotating annular ring having a hollow core or vortex. Such a working circuit, for the left half only of the dynamometer shown in Fig. 1, is diagrammatically illustrated in Fig. 2, with the annular core or vortex being identified by the letter V, the lines and arrows X indicating the general rotary path of travel of the liquid in a given transverse plane and the lines and arrows Y indicating the path of circumferential travel of the liquid in following the working circuit of the dynamometer.

The flexible water hose connections 24, 33 and 35, and the flexible air hose connection 47 will permit the relative rotary movement of the brake housing 1 necessary for the torque arm 65 to actuate the torque indicating device 67 to obtain an indication of the horsepower being developed by the engine being tested.

It will be apparent that as the volume of liquid in the working circuit is reduced, as by opening the valve 29, the torque load on the engine being tested will be correspondingly reduced with the result that the core or vortex V will become larger, and theoretically expand as the brake liquid is withdrawn from the dynamometer, the vortex ultimately expanding to the size of the space within the brake housing when nearly all of the liquid has been withdrawn.

When the dynamometer housing contains no liquid, the only resistance to rotation of the rotor 14 is the air present within the dynamometer housing 1 and such resistance is referred to as the "windage" load. The windage load can be assumed to be caused by the circulation of air within the working circuit of the dynamometer in following a path similar to that of the brake liquid, but, of course, the windage load will be comparatively low because of the relatively low density of air at atmospheric pressure compared with that of water or any other liquid.

Certain difficulties in the way of instability, hunting or surging are encountered when, as previously mentioned, an attempt is made to absorb the load developed by a small engine with a large dynamometer, whose lower limit of its power absorption range is above that of the power developed by said small engine. In such instances, a very small amount of liquid in the large dynamometer would absorb the load, but it was found that no reliable readings could be obtained because the load was non-uniform or, in other words, the dynamometer was unstable. I discovered that, under the stated conditions, the dynamometer B could be stabilized and satisfactory tests could be made below the normal operating range of said dynamometer by introducing compressed air, i. e., air under superatmospheric pressure, into the brake housing 1 to control, as I believe, the working path of the small volume of brake liquid necessary to absorb the low load.

Thus, in testing an engine developing a comparatively low horsepower, the brake loading valve 23 is adjusted to introduce the brake liquid into the housing 1 through the opening 19 to place the desired load on the engine. The air inlet valve 50 is adjusted to admit air under superatmospheric pressure into the housing 1 through the flexible hose or conduit 47, etc., and opening 39, until the load absorbing action of the brake liquid is stabilized. Usually, a pressure of about 15 lbs. per square inch above atmospheric pressure will prove satisfactory, although in some instances I have used pressures as high as 40 lbs. per square inch and as low as 5 lbs. per square inch. The valve 23 may again be opened to increase the load and the valve 50 also opened, if this is necessary, to increase the air pressure to maintain stability. In any event, the gauge 46 will indicate the air pressure in the brake housing 1, and if desired this pressure may be pre-set for a given dynamometer by manipulation of the air inlet valve 50, before the test is started. The air exhaust valve 44 may be opened in the event that the pressure within the brake housing 1 is greater than desired, or to exhaust the air above atmospheric pressure from said brake housing at the end of the test. The brake loading valve 23 is opened to further load the engine, as desired, and the brake unloading valve 29 is opened, as desired, to reduce the load on said engine.

My reasons, in support of the explanation of why compressed air stabilizes the dynamometer and enables its normal load absorption capacity range to be extended, are as follows:

During periods of extremely light load absorption capacity, only a small volume of brake liquid is required to be present in the brake housing and, therefore, the vortex or core V (Fig. 2), would be large and filled with air under substantially atmospheric pressure and therefore be readily compressible. This compressible void, as well as other voids within the working circuit, permits the normal circulation of the liquid to become ragged and to lack uniform distribution. Consequently, it is reasonable to assume that the circulating mass of liquid can surge in and out with respect to the center of the vortex V, or that jets or portions of the brake liquid can spasmodically short-circuit across the void, thereby departing from the normal theoretical working path and intended operation with resultant and drastic changes in torque absorption load capacity. Such spasmodic performance will be readily apparent from the fact that the circulation of any turbulent liquid even through pipes or open flumes, is anything but uniform and predictable. Therefore, it is reasonable to assume that, if the central void or vortex V could be controlled in some way or made less compressible, greater stability of the liquid flow would result. Previous attempts to attain such stability have comprised filling the core space of hydraulic dynamometers or couplings with a solid or hollow toroidal ring, but these expedients introduced new difficulties and did not entirely solve the old problem.

My solution to the problem lies in the discovery that, in lieu of filling the vortex or core space V with a toroidal ring, the desired shape thereof can be satisfactorily controlled by introducing air under superatmospheric pressure into the housing. Compressed air is readily available and is mentioned as a specific operative example of a suitable gaseous medium under superatmospheric pressure that can be employed to solve the problem involved. While the term "compressed air" is employed hereinafter in the specification and claims, it is to be understood that the invention is not limited to the use of compressed air, but that this term is merely used for convenience in defining certain phases of the invention broadly and is to be construed as inclusive of air or any other suitable gaseous medium under superatmospheric pressure.

I have also found that compressed air, when introduced into a dynamometer housing will find its way to the voids and to the core V of the working circuit, irrespective of the point where the compressed air is introduced into the housing. This follows as a natural result of the differences in density of the compressed air and the brake liquid. Hence, the voids in the working circuit are automatically filled with compressed air, which is more dense than air under atmospheric pressure, and as a result thereof, a vortex filled with such air opposes the forces which tend to produce jets or short-circuiting of the brake liquid across the vortex. Therefore, it is only necessary to provide sufficient superatmospheric pressure in the voids of the working circuit to overcome these disturbing forces, in order to maintain stability and dependable load absorption by the dynamometer.

It has been found in actual practice that an air pressure of 5 to 40 lbs. per square inch gauge is usually sufficient to maintain stability in the brake liquid within a dynamometer, but the pressure required will vary for different loads and be entirely dependent on the magnitude of the forces tending to disturb stability under any given load. Usually, a pressure of about 15 lbs. per square inch above atmospheric pressure will prove satisfactory, although in some instances I have used pressures as high as 40 lbs. per square inch and as low as 5 lbs. per square inch. Any desired air pressure condition can be maintained in the dynamometer housing 1 by manipulation of the valves 44 and 50.

It will be understood that the foregoing theories or explanation as to why compressed air under superatmospheric pressure extends the lower limit of the operating range of a dynamometer, and produces results heretofore unattainable with hydraulic brakes or dynamometers, are not to be construed in any way as limiting the invention inasmuch as they are merely offered as a plausible explanation of the principles of operation of the invention, it being readily apparent that it is extremely difficult to analyze or determine the exact operating characteristics of any dynamometer working circuit. That the invention is operative to increase the utility of hydraulic dynamometers has been demonstrated by actual tests. Certain of the results attained with such tests are indicated in Fig. 3, which is representative of one phase of the work that has been done in the study of dynamometer problems.

Figure 3:
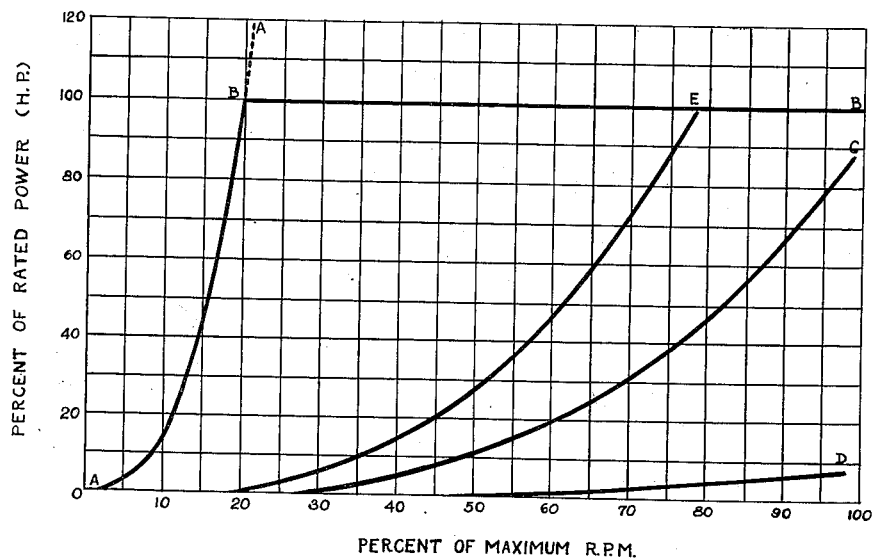
Fig. 3 is a graph illustrating certain typical ranges of operation of a hydraulic dynamometer.

In Fig. 3, the line B—B represents operation at 100% of the rated power of the dynamometer and the curve A—A represents the speed horsepower curve with the dynamometer full of liquid, that is to say, a dynamometer in which no vortex of air is present and all of the liquid is available to absorb power. Under such conditions, the curve A—A naturally represents the maximum power that can be absorbed by the dynamometer, and due to the absence of air voids, the dynamometer will be stable and free from hunting or surging under all torque loads. However, it is not possible to conduct certain tests with the dynamometer full of brake liquid and therefore the volume of liquid in the dynamometer housing must be varied.

The curve A—C represents the typical minimum horsepower curve of dynamometers which have been studied and in which stability was maintained even though the volume of liquid in the brake circuit was reduced. Hence, it may be said that the voids created by reducing the quantity of brake liquid down to that necessary to absorb the horsepower shown by the curve A—C are not large enough to produce a poor pattern of liquid circulation within the working circuit of the dynamometer. The curve A—D represents the power absorbed by a typical dynamometer when all brake liquid has been removed therefrom and the only resistance to rotation of the rotor is the air present within the dynamometer housing. Any power then absorbed is the result of windage resistance of the dynamometer, and since air alone is present within the dynamometer, no problem of irregular flow is created as is the case when the dynamometer contains two mediums having different densities such as liquid and air. The dynamometer, of course, is stable when full of air, just as it is when it is full of liquid. However, it is desirable in practice to provide a dynamometer unit in which the curve A—C will coincide with the curve A—D, thereby providing complete stability and permitting the useable and controllable range of the dynamometer to fall anywhere between the curves A—A and A—D. The use of compressed air under superatmospheric pressure in the dynamometer will permit this desirable result to be obtained. As a matter of fact, under certain load conditions compressed air alone under superatmospheric pressure may be employed in the dynamometer housing and this will cause the windage curve to go up even though no liquid at all is present in the working circuit. The explanation of this phenomenon is, of course, that the denser air at superatmospheric pressure being circulated within the dynamometer increases the resistance to rotation of the rotor so that the dynamometer is rendered capable of absorbing a greater torque load than when less dense air at atmospheric pressure is present in the dynamometer. Of course, the power absorbed by the denser air will be converted into heat and the air within the dynamometer will become heated. However, cooling of the air can be effected by any suitable or conventional means to prevent excessive or undesirable heating of the air within the dynamometer, as will be shown hereinafter.

Actual tests have also shown that the power absorbed at any given speed and with any given quantity of liquid in the brake housing short of completely filling the housing, can be increased by the introduction of compressed air. For example, let it be assumed that a dynamometer is operating with a sufficient quantity of liquid within its working circuit to absorb the power shown by the curve A—C of Fig. 3. As compressed air is introduced into the dynamometer, its ability to absorb power at any given speed increases with the increase in air pressure even though the same volume of liquid is maintained within the housing. The power speed curve can often be increased under these conditions to that shown by the curve A—E. While some of this gain is due to the circulation of a denser gaseous medium within the vortex V, the majority of the gain is deemed to be due to the circulation of the liquid in a manner more closely approaching the theoretical perfect circulation path for the given dynamometer, which would obviously result in greater power absorption than if the liquid were allowed to circulate more or less uncontrolled about its working circuit.

In hydraulic couplings or dynamometers that vary the quantity of liquid to change the torque load, there is often a point or points in the operating range thereof where slight changes in torque load are impossible to attain. Thus, it is possible in actual operation for a dynamometer absorbing 350 horsepower at 1800 R. P. M. to be able to absorb this same power at 1790 R. P. M., the latter being a critical point incapable of being reached in the operation of the dynamometer due to certain design characteristics, etc., which sometimes produce unpredictable and undesirable operating tendencies. The introduction of additional brake liquid into the housing would serve to increase the load to say 350 horsepower and reduce the speed to 1700 R. P. M. Again, the removal of the same volume of brake liquid would bring the dynamometer back to 350 horsepower at 1800 R. P. M. The explanation of this phenomenon is of no importance here, although it does occasionally occur in practice in the best designed dynamometers and is a source of considerable trouble. However, inasmuch as the dynamometer will operate satisfactorily, for example, with a volume of liquid required to absorb 350 horsepower at 1800 R. P. M. and the slightest increase in the volume of liquid results in dropping the speed to say 1700 R. P. M., it may be said that the dynamometer has reached a stage where vernier control is impossible or, in other words, a condition where with practically the same quality of liquid in the working circuit it can absorb 350 horsepower at two speed points. I have found that speed points within such critical range can be easily reached by maintaining the necessary quantity of liquid to insure stability, for example, that required to absorb 350 horsepower at 1800 R. P. M., and injecting compressed air into the dynamometer until the air pressure is such that the dynamometer will absorb 350 horsepower at 1790 R. P. M., and absorb the same horsepower under increased air pressure at 1780 R. P. M., and so on. In this way the dynamometer can be controlled to perform tests at speeds through a range critical to the dynamometer and normally impossible to attain. So that here again, a new result is obtained.

Another important advantage of the use of compressed air in dynamometers, in addition to those pointed out hereinbefore, is that such air reduces the noise and vibration of the dynamometer. It further appears that by filling the voids in the working circuit with air under superatmospheric pressure, less cavitation can occur with a resultant reduction or elimination of hydraulic shocks and harmonics. Thus, the noise level of the apparatus is reduced, as is also the harmonic resonance or forced vibrations caused by or originating from the hydraulic forces. In addition, the reduced cavitation eliminates cavitational erosion or wear within the working circuit.

In testing certain engines developing low horsepower, the heat absorbed by the liquid in the brake unit may not be sufficient to effect vaporization of said liquid, and this is especially true in view of the fact that the temperature of the liquid would have to be raised substantially above 212° F. to vaporize the same in a housing under super-atmospheric pressure. In performing certain tests on other engines developing a sufficient horsepower to heat the brake liquid to a point of vaporization, such vaporization can be avoided by opening the brake unloading valve 29, but throttling the same sufficiently to prevent any substantial reduction of the air pressure in the brake housing, while at the same time maintaining the brake loading valve 23 open slightly to continuously admit brake liquid into the housing at a rate equal to that of the liquid being discharged through the brake unloading valve 29. The air inlet valve 50 can be opened slightly, if necessary, to maintain the desired air pressure in the housing 1 while such continuous flow of brake liquid through said housing is maintained. In instances where a uniform or constant load is desired and cooling of the brake liquid is necessary, the unloading valve 29 is closed and the load determined by adjustment of the loading valve 23; and the circulation control valve 32 is opened to the extent desired to provide for circulation of the brake liquid through the coil 34 of the heat exchanger H. Different constant loads can be imposed by manipulation of the valves 23 and 29 to vary the volume of brake liquid in the housing 1.

Fig. 4 diagrammatically illustrates hydraulic dynamometer apparatus including a control system for automatically controlling the air pressure within the dynamometer housing in accordance with the pressure developed in the brake liquid during a test. In Fig. 4, the numeral 80 generally identifies a reversible hydraulic brake or power absorption unit including a stator or housing 81, a rotor 82 and a shaft 83 carrying the rotor and journalled in the housing 81. The power absorption unit 80 includes an outlet 84 at the lower portion thereof through which brake liquid is adapted to be expelled from the housing 81 as a result of the pumping action of the rotor 82. The brake liquid is forced out through one or the other of a pair of pockets 84$^a$, depending upon the direction of rotation of the rotor 82. A conduit 85 has one end thereof connected with the outlet 84 and its opposite end connected with the inlet of a heat exchanger coil 86, which is normally full of brake liquid. The outlet of the heat exchanger coil 86 is connected with one end of a return conduit 87 and the opposite end of said conduit communicates with the interior of the dynamometer housing 81 at a low pressure zone thereof. The heat exchanger coil 86 is received in a casing 88 having a cold water supply pipe 89 connected thereto adjacent one end thereof and a cold water discharge pipe 90 connected thereto adjacent the opposite end thereof. Hence, it will be apparent that the brake liquid forced out of the outlet 84 by the rotor 82 will pass through the discharge conduit 85 into the heat exchanger coil 86, to be cooled by the water circulating in the casing 88, and then be returned to the housing through the return conduit 87; it being apparent that the same volume of liquid which has been forced into the discharge conduit 85 will be returned to the brake housing 81 through the return conduit 87 so that the volume of liquid present in the brake housing 81 is maintained constant.

The discharge conduit 85 is connected with a conduit 91 having a conventional check valve 92 connected therein and arranged to permit flow only in a direction toward the discharge conduit 85. A conduit generally identified by the numeral 93 includes a portion 94 which connects the conduit 91 with one side of a solenoid operated valve 95, the opposite side of said solenoid operated valve being connected by a pipe nipple 96 to one side of a conventional, reversible gear type pump 97, which is driven by a reversible electric motor 98. The opposite side of the pump 97 is connected to one end of a conduit 99, and the opposite end of said conduit extends into a brake liquid storage tank 100. An air vent 101 vents the tank 100 to the atmosphere at all times.

A by-pass conduit 102 is connected with the conduit 91 in by-passing relation with respect to the check valve 92. The by-pass conduit 102 has a plate with an orifice 103 arranged therein, the purpose of which will be set forth later.

The system for automatically introducing air under superatmospheric pressure into the dynamometer 80 to maintain stability, includes a conventional pressure regulator valve 104, which has a body 105 provided with an inlet 106 having one end of a conduit 107 connected therewith. The opposite end of the conduit 107 is connected with a source of supply (not shown) of air preferably under a pressure in excess of forty lbs. per square inch gauge pressure. The pressure regulator valve 104 also includes a cover 108, and a diaphragm 109 is disposed between said cover and the valve body 105. The pressure regulator valve 104 is a ¼ inch valve, and the diameter of the area of the underside of the diaphragm 109 subject to pressure is, in one operative form of the invention, 2 inches. A spring 110 is disposed in the cover 108 so that it exerts a downward pressure on the diaphragm 109, thereby tending to urge a valve disc 111 out of contact with its associated seat 112 to effect opening of the valve 104. An adjusting screw 113 is provided to adjust the compression of the spring 110 in order to regulate the maximum pressure that can be introduced into the system, for example, say a pressure of thirty lbs. per square inch gauge pressure. It will be apparent that when the spring 110 is adjusted to the pressure stated, the air pressure within the valve body 105 will act upwardly on the diaphragm 109 and urge the disc 111 into engagement with the seat 112 to close the regulator valve 104.

The valve body 105 has an outlet opening 114 to which one end of a conduit 115 is connected. The opposite end of the conduit 115 is connected with an inlet opening 116 formed in a body portion 117 of a ⅜ inch pressure differential operated valve generally identified by the numeral 118. A pressure gauge 119 is connected in the conduit 115 between the pressure regulator valve 104 and the pressure differential operated valve 118 in order to provide a visual indication of the pressure of the air or gas being supplied to the control system.

The pressure differential valve 118 includes an intermediate section 120 and a diaphragm 121, which is arranged between the lower side of the intermediate section 120 and the upper portion of the valve body 117. The diaphragm 121 carries a valve disc 122 which cooperates with a seat 123 formed in the body 117. The valve body 117 has an outlet opening 124, and the effective area of the lower side of the diaphragm 121 subject to the pressure in said outlet opening is, in one operative form of the invention, 1 and ⅝ inches in diameter. The outlet opening 124 is connected by portions 125 and 126 of the conduit 93 with the portion 94 of said conduit.

The pressure differential valve 118 further includes a cover 127 and a diaphragm 128 is disposed between the lower surface of said cover and the upper surface of the intermediate section 120. The diaphragm 128 carries an abutment member 129 which contacts a supporting plate 130 that is secured to the diaphragm 121. Hence, any downward flexing movement of the upper diaphragm 128 will be directly transmitted through the abutment member 129 and supporting plate 130 to the lower diaphragm 121. A compression spring 131 is disposed in the cover 127 and tends to flex the diaphragm 128 downwardly at all times. An adjusting screw 132 is carried by the cover 127 and associated with the spring 131 to vary the tension thereof. A conduit 133 has one end thereof connected with an opening 134 communicating with a chamber 135 above the diaphragm 128 in the cover 127. The opposite end of the conduit 133 is connected to an intermediate point of an air bleed conduit 136. An air expansion chamber 137 is connected in the conduit 133 between the pressure differential valve 118 and the conduit 136. One end of the conduit 136 is connected at 138 with a low pressure zone of the hydraulic brake 80, and the opposite end of said conduit is connected with a conventional ⅜ inch vacuum operated air bleed valve 139. Thus, it will be apparent that the lower diaphragm 121 is subject to the pressure condition prevailing in the conduit 93 and the upper diaphragm 128 is subject to the pressure at the point 138 in the brake housing 81, as communicated to the chamber 135 through the conduit 133. The effective area of the upper diaphragm 128 exposed to pressure in the chamber 135, in one operative form of the invention, is 2 and ⅛ inches in diameter, or exceeds the diameter of the effective area of the lower diaphragm by one-half inch. The space in the intermediate member 120 between the diaphragms 121 and 128 is vented to the atmosphere through an opening 140. The difference in the effective areas of the diaphragms 121 and 128 renders the pressure regulator valve 118 automatically self-closing, as will be explained in greater detail hereinafter.

The air bleed valve 139 includes a body portion 141, which has an inlet opening 142 connected with one end of the air bleed conduit 136. The valve 139 also includes a cover 143 and a diaphragm 144 disposed between said cover and the body 141. The diaphragm 144 has a valve disc 145 secured thereto which is adapted to engage a seat 146 on the valve body 141. A light spring 147 is disposed in a chamber 148 of the cover 143 and is arranged to urge the disc 145 toward its seat 146. The cover 143 is provided with an opening 149 communicating with the chamber 148 and one end of a conduit 150 is connected with said opening, the opposite end of said conduit being connected with the conduit 93, so that the pressure in the conduit 93 is also communicated to the diaphragm chamber 148 of the air bleed valve 139. The effective area of the diaphragm 144 subject to the pressure in the chamber 148 is, in one operative form of the invention, 1 and ⅝ inches in diameter.

The air bleed valve 139 has an outlet opening 151 having one end of a conduit 152 connected therewith, the opposite end of said conduit being connected with an intermediate point of an air exhaust conduit 153. One end of the air exhaust conduit 153 is connected to the brake liquid storage tank 100 and the opposite end of said conduit is connected with the outlet 154 in the valve body 155 of a conventional ⅜ inch air pressure relief valve 156. The relief valve 156 includes a cover 157 and a diaphragm 158 between said cover and the valve body 155. The diaphragm 158 carries a disc 159, which engages a seat 160 upon the valve body 155. A spring 161 within the cover 157 urges the diaphragm 158 and disc 159 toward the seat 160, and an adjusting screw 162 is cooperable with the spring 161 to set the valve 156 to relieve the pressure in the system at any desired pressure, for example, thirty-five pounds per square inch gauge pressure.

The valve body 155 has an inlet opening 163 to which one end of a conduit 164 is connected, the opposite end of said conduit being connected with the conduit 133 so that the inlet side of the relief valve 156 is subject to the pressure in the air bleed conduit 136. Another conduit 165 has one end thereof connected with the conduit 133 and its opposite end connected with the outlet of a conventional air check valve 166. The inlet side of the air check valve 166 is connected with a pipe nipple 167, which preferably communicates with the atmosphere. The air check valve 166 is arranged to admit air into the system to avoid creating subatmospheric pressures in the system.

The load absorption capacity of the hydraulic brake 80 can be varied by driving the pump 97 through the reversible motor 98 to either pump liquid from the tank 100 and force it into the brake housing 81 to load said brake, or to pump liquid from said housing and return it to the tank 100 to unload said brake. To this end, the reversible motor 98 is controlled by a manually operable double throw switch 169 including an arm 170 which, when engaged with the contacts 171, is adapted to drive the motor 98 to load the dynamometer 80 and which, when engaged with contacts 172, is adapted to drive the motor 98 to unload the dynamometer 80. The solenoid operated valve 95 is connected to the switch 169 by leads 174 and 175 arranged so that the solenoid coil 176 is deenergized when the contacts 171 are engaged by the switch arm 170, and the valve 95 is then opened by the pressure of the liquid forced into the system by the pump 97 during loading of the dynamometer 80, and the valve 95 is positively held open by energization of the solenoid coil 176 when the contacts 172 are engaged by the switch arm 170 and the pump 97 is withdrawing liquid from the dynamometer 80 to reduce the load absorption capacity thereof.

Torque arms 177 are arranged diametrically of the housing 81 and are secured thereto by bolts 178, said arms being adapted to respectively actuate torque indicating apparatus similar to that identified by the numeral 67 in Fig. 1.

While the apparatus shown in Fig. 4 is adapted for general use in absorbing the power of a rotating shaft, for present purposes, the apparatus will be described in connection with the use of the same as a dynamometer for testing prime movers, for example, internal combustion engines.

Assuming that an engine crankshaft has been suitably connected in driving relation with the rotor shaft 83, so that the rotor 82 is driven by the engine, any desired load within the capacity of the brake 80 can be imposed upon the engine by operating the switch 169 to vary the volume of brake liquid introduced into or withdrawn from the closed circulating system for said liquid, i. e., the brake housing 81 and the heat exchanger coil 86. Thus, and assuming further that the system as a whole contains no brake liquid at the start of a test, but contains only air under atmospheric pressure, actuation of the switch arm 170 to engage the contacts 171 of the switch 170 will cause the motor 98 to drive the pump 97 to withdraw brake liquid from the storage tank 100 and to force it through the valve 95 into the portion 94 of the conduit 93. Liquid from the conduit portion 94 will flow through the conduit 91 past the check valve 92 into the conduit 85 and thence into the heat-exchanger coil 86. After the heat exchanger coil 86 has been filled, the liquid will flow through the conduit 87 and thence into the housing 81 to enter the working circuit of the dynamometer 80 to resist rotation of the rotor 82 and apply a load to the engine being tested. The action of the rotor 82 tends to force the brake liquid out of the housing 81 through one or the other of the pockets 84ª, depending upon the direction of rotation of said rotor, and into the conduit 85 from whence it flows into the coil 86 to be cooled. The liquid forced out of the housing 81 cannot flow past the check valve 92 during loading because the pressure developed by the pump 97 exceeds that developed by the rotor 82. It will be apparent that the rotor 82 will cause a volume of liquid equal to that displaced from the housing 81 and introduced into the coil 86 to be displaced from said coil for return through the conduit 87 to the brake housing 81.

It will be understood that while the dynamometer 80 is being loaded, the pressure developed in the brake liquid in the closed circulating system by the rotor 82 will be transmitted through the portions 126 and 125 of the conduit 93 to the outlet side 124 of the pressure differential valve 118 so that it will act on the under side of the diaphragm 121 tending to raise the disc 122 from its seat 123 to open the valve 118. Such opening of the valve 118 is opposed by the pressure of the spring 131 plus the pressure of the air in the housing 81 as communicated to the chamber 135 through the conduits 136 and 133 to act upon the upper side of the diaphragm 128. As the liquid pressure acting on diaphragm 121 becomes high enough to overcome the combined spring force and air pressure acting on the diaphragm 128, the valve 118 will automatically open to admit air under superatmospheric pressure into the system to offset the hydraulic pressure of the brake liquid. Therefore, normally, when the hydraulic brake or dynamometer 80 is first placed in operation, air under superatmospheric pressure cannot find its way into said brake or dynamometer until liquid has been introduced thereinto and a hydraulic pressure built up which is sufficient to raise the disc 122 of the valve 118 from the seat 123.

It will be observed at this point that the control system is protected against undesirable air pressure conditions within the dynamometer 80 even when no brake liquid under pressure is present, by virtue of the fact that the differential valve 118, with its diaphragms 121 and 128 of different size, is automatically operated to close in the event that any air should escape or leak through the seat 123. Thus, if any air under superatmospheric pressure should escape through the valve 118 into the dynamometer 80 and control system, such air pressure would act upon both the diaphragms 121 and 128, and since the effective area of the diaphragm 128 is the greater, the disc 122 would be urged tightly against its seat by said air pressure to effect closing of the valve 118.

It will be understood from the foregoing that brake liquid is introduced into the dynamometer 80 before any superatmospheric pressure is automatically admitted thereto through the air pressure control system. Tests have shown that there is a definite relationship between the torque load or pressure developed in the brake liquid, and the degree of superatmospheric pressure required in a brake housing to obtain satisfactory control stability and smooth operation of a dynamometer. This balance of dynamometer load and air pressure is obtained by the relative effective pressure areas of the diaphragms 121 and 128. Hence, it will be apparent that as the load is successively increased to subject the prime mover undergoing test to successively increasing loads, the increased pressure on the brake liquid developed by the action of the rotor 82 will produce a corresponding operation of the valve 118 so that the liquid pressure acting on the diaphragm 121 will be offset or balanced by the introduction of air under superatmospheric pressure to correspondingly raise the air pressure within the dynamometer housing 81. The air thus introduced, when it reaches a value correlated to the hydraulic pressure, will be effective on the diaphragm 128 to close the valve 118 so that stability and smooth operation of the dynamometer is automatically maintained at all times.

It will also be understood that Fig. 4 is a diagrammatic view showing the various elements of the control system interconnected by conduits which are exaggerated in length to facilitate illustration. In actual practice, the valves are grouped and interconnected by fittings of minimum length, so that when air is introduced into the system upon opening of the valve 118, its path of travel is very short before it reaches the housing 81 and, while such air must displace the liquid from the outlet side of the valve 118 in order to enter said housing, no air columns or air pockets are formed in the system that would have a detrimental effect on its operation.

The system shown in Fig. 4 is not only capable of automatically increasing the air pressure within the dynamometer 80 as the volume and pressure of the brake liquid is increased to increase the load absorption capacity thereof, but is also capable of automatically reducing the air pressure within the system as the volume and pressure of the brake liquid is reduced to lower the torque load absorption capacity of said dynamometer.

When the desired balance of hydraulic and air pressure at the outlet 84 of the dynamometer and the air pressure at the air bleed connection 138 are obtained, the pressure differential valve 118 will automatically close, as above described, and the apparatus will operate under a state of settled conditions for any given load for an indefinite period of time. If the speed of the engine, and hence the speed of the rotor 82, is increased without changing the volume of brake liquid within the dynamometer housing 81, the pressure at the outlet 84 will increase but the pressure at the point 138 will remain substantially unchanged. The change in pressure at the outlet 84 is due to a change in the hydraulic forces resulting from the increased speed of the rotor 82, and this does not substantially affect the pressure at the air bleed point 138. If the increase in the hydraulic pressure is such as to require an increase in the superatmospheric pressure in the dynamometer for stability, the increased hydraulic pressure effective upon the underside of the diaphragm 121 will raise the disc 122 from its seat 123 causing the valve 118 to open and permit more air under pressure to enter the system. Upon reaching the desired balance of pressures at the outlet 84 and the point 138, the valve 118 will again close.

It will be obvious that the valve 118 will permit the gradual admission of superatmospheric pressure into the dynamometer 80 as the pressure of the brake liquid increases. A gradual increase in pressure is necessary and highly desirable in order to avoid a sudden admission of air under pressure immediately after the initial introduction of brake liquid into the empty dynamometer housing 81. For example, if a small volume of liquid were pumped into the dynamometer housing 81, and the valve 118 were opened to permit the maximum air pressure to enter said housing, a large increase in torque load would result, which would prevent obtaining the minuteness of adjustment of load that is desirable in infinitely variable torque load absorption devices.

On the other hand, during the course of a test, the engine speed, and hence the speed of the rotor 82, may be reduced while a given volume of brake liquid is in the system, without adversely influencing the operation of the dynamometer 80, since a greater air pressure within the dynamometer 80 than is required for stability with a particular torque loading has no ill effects. It is preferable, however, that the control system shall automatically provide for the reduction of the air pressure within the dynamometer housing 81 as the brake liquid is withdrawn therefrom, with the air pressure and the liquid pressure being so correlated that atmospheric pressure is restored within the dynamometer housing 81 as the last portion of the brake liquid is withdrawn therefrom. Such automatic reduction of the air pressure within the dynamometer 80 is effected through the automatically operating air bleed valve 139. Thus, when the arm 170 of the switch 169 is actuated to engage the contacts 172, the valve 95 will be held open and the motor 98 will drive the pump 97 in a direction to withdraw liquid from the housing 81 to unload the dynamometer, as has been previously explained. During the operation of the pump 97 to withdraw brake liquid from the housing 81, the check valve 92, of course, is automatically closed so that the withdrawal of brake liquid must take place around the check valve 92 through the by-pass conduit 102. The pressure at the outlet 84 of the dynamometer 80 is reduced to the extent permitted by the restriction to withdrawal of brake liquid offered by the orifice 103 in the by-pass conduit 102. The orifice 103 restricts the rate of flow of brake liquid to less than the capacity of the pump 97, so that the pump tends to create a vacuum condition in the conduit 93 which is communicated to the outlet side 124 of the pressure differential valve 118 so that the diaphragm 121 is now subject to the subatmospheric condition in the conduit 93. This means, of course, that the valve 118 will remain closed. The subatmospheric pressure condition in the conduit 93 is also communicated to the chamber 148 of the air bleed valve 139 through the conduit 150 so that the air pressure in the housing 81 is communicated through the conduit 136 to the inlet side of the valve 139 and since such pressure is greater than subatmospheric it will aid in effecting opening of the air bleed valve 139 so that air under superatmospheric pressure can escape from the housing 81 through the air exhaust conduit 153 and be discharged into the tank 100. The discharged air can escape from the tank 100 through the vent 101 to the atmosphere. As the load control pump 97 is operated to withdraw brake liquid to reduce the torque load, the above sequence of operations occurs so that the air pressure is gradually reduced within the dynamometer housing 81 to that required for stability under the given load under which the dynamometer is then operating. If the operation of the valve 139 should "overshoot" for any reason and reduce the pressure below that required for stability, the valve 118 will operate to almost instantly restore the air pressure to the correct magnitude when the pump 97 is stopped.

It is obvious that care must be exercised in selecting the size of the various valves employed in the automatic air pressure control system disclosed herein in order to avoid "lag" in operation or "overshooting." This is necessary in order to provide a sensitive control system, and in accordance therewith, the important valve sizes and the diameters of the effective areas of the diaphragms have been specifically set forth herein as illustrating one operative embodiment of the invention. It will be understood, however, that the sizes of the valves and diaphragms can be varied in accordance with the size of the dynamometer and the requirements of a given installation.

In order to avoid the possibility of excessively high air pressures developing in the dynamometer 80, as a result of undue compression of the air, as might occur if the air bleed valve 139 failed to operate to vent air and the dynamometer was allowed to become substantially filled with brake liquid, the relief valve 156 is arranged to open automatically to relieve any pressure in excess of that for which it has been set. The air thus relieved will pass through the conduit 153 to the storage tank 100 and to the atmosphere through the vent 101, the same as air relieved through the air bleed valve 139.

The air check valve 166 is normally closed when superatmospheric conditions prevail within the housing 81 but is arranged to open to permit air to enter said housing to replace the brake liquid as the brake liquid is removed to reduce the torque load, so that in no event will a subatmospheric pressure condition occur in the housing 81 during the withdrawal of the brake liquid. The air check valve 166 is not absolutely necessary in the control system disclosed herein, inasmuch as the presence of subatmospheric pressure within the absorption unit will facilitate the opening of the air bleed valve 139, permitting air to enter the system through the air vent 101 in the tank 100 and through the conduits 153 and 152, valve 139, and conduit 136 to the point 138 of the dynamometer housing 81. The air check valve 166 is usually employed, however, as it is a comparatively inexpensive item and insures a greater factor of safety in the event that the air bleed valve 139 fails or becomes sluggish in its operation in response to slight subatmospheric pressures on the lower side of the diaphragm 144.

The purpose of the air chamber 137 in the conduit 133 is to provide a simple means of removing any brake liquid from the air exhausted from the system as a result of the opening of the air bleed valve 139. Thus, chamber 137 provides an enlarged zone wherein the air under pressure flowing from the dynamometer 80 through the air bleed line 136 can expand and the velocity reduced thereby to a point where any brake liquid entrained in the air is separated from said air and returned by gravity to the housing 81 at the point 138. There are light pulsations of pressure at the point 138, due to the rotation of the vaned rotor 82, so that the brake liquid separated from the air by the chamber 137 can readily find its way back into the dynamometer housing at the point 138. The function performed by the expansion chamber 137 is important and highly desirable for the reason that the air bleed valve 139 may be caused to operate frequently during a test at different speeds under a predetermined given torque load, and it would be highly undesirable to lose any of the brake liquid imposing said load through entrainment thereof in the air being exhausted from the unit. The return of such entrained brake liquid to the housing 81 assures the maintenance of a constant load by the dynamometer 80 regardless of variations in the speed at which the prime mover is operated.

Fig. 5 diagrammatically illustrates a dynamometer apparatus somewhat similar to that shown in Fig. 4, but including means for enabling the same to be operated with either: air alone under superatmospheric pressure in the dynamometer housing; with brake liquid and superatmospheric pressure in the dynamometer housing; or with air alone under subatmospheric pressure in the dynamometer housing. The parts of the modified apparatus corresponding to those already described in connection with Fig. 4 have been identified by the same reference numerals.

When the apparatus shown in Fig. 5 is operated with a gaseous medium under superatmospheric pressure, the admission of such medium into the dynamometer housing 81 is controlled by a manually operated valve 179 which is connected in a supply conduit 180. The conduit 180 is connected with the dynamometer housing 81 at 138 by a branch conduit 182. A branch pipe 183 having a manually operable air exhaust valve 184 connected therein is connected with the conduit 180 at a point between the dynamometer 80 and the valve 179. A combined air pressure and vacuum gauge 185 is connected in the conduit 180 to indicate the pressure condition within the housing 81. The outlet side of the valve 184 is connected by the branch pipe 183 with an air exhaust conduit 153ª. Such connection has its principal utility when the dynamometer 80 is operated with both brake liquid and air under superatmospheric pressure and is being unloaded, inasmuch as it effects the return to the tank 100 of any brake liquid that might possibly be entrained with the air under pressure exhausted from the dynamometer housing 81 as a result of manual manipulation of the valve 184. However, it is to be noted that the expansion chamber 137 is normally quite effective to separate all of the brake liquid from the air and return the brake liquid to the housing 81 through the branch conduit 182 in order to maintain the volume of liquid in said housing constant even though the air pressure within the housing 81 may be varied during the manipulation of the valve 184 to effect stabilization of the brake liquid in the dynamometer 80 under certain critical speeds of said dynamometer.

A relief valve 156ª similar to the air pressure relief valve 156 has its outlet side connected to the conduit 153ª and functions as a safety valve to prevent the creation of excessive air pressures within the dynamometer housing 81. A conduit 187 is connected with the inlet side of the relief valve 156ª and has an air check valve 188 connected therein, together with a manually operable shut-off valve 189 disposed between the air check valve 188 and the pressure relief valve 156ª. The valve 189 is maintained opened except when the dynamometer 80 is being operated with subatmospheric pressure, as will be explained later. Hence, the air check valve 188 will automatically function to prevent the creation of subatmospheric pressure within the dynamometer 80 as brake liquid is withdrawn by the operation of the pump 97. A conduit 190 connects the expansion chamber 137 with the conduit 187 at a point between the valves 156ª and 189.

It will be understood that brake liquid is introduced into and withdrawn from the housing 81 in response to manual actuation of the switch 169, in the same manner described in connection with Fig. 4. However, with the manual air pressure control valves 179 and 184, the pump 97 is not required to produce a vacuum condition in the conduit portion 94ᵃ and, hence, the check valve 92, by-pass conduit 102 and the orifice 103 shown in Fig. 4 are unnecessary and are omitted from the conduit portion 91ᵃ. Nevertheless, in order to adapt the system for operation with subatmospheric pressure, a conduit 195 is connected with the conduit 85 and a manually operable valve 196 is connected in the conduit 185 between the dynamometer outlet 84 and the conduit 91ᵃ. One end of the conduit 195 is connected with the inlet of a conventional suction-type blower 197 which is driven by a motor 198 controlled by a manually operated switch 199. In order to prevent brake liquid from being drawn into the dynamometer housing 81 while the blower 197 is being operated, a manually operated valve 200 is connected in the return conduit 87ᵃ; the valve 200 and the valve 196, of course, being closed at such time.

As explained in connection with the chart of Fig. 3, the range of large dynamometers may be increased by reducing the "windage" resistance thereof so that the lower limit of usefulness of the dynamometer corresponds substantially with the abscissa line of the chart. When it is desired to operate the dynamometer 80 of Fig. 5 under subatmospheric pressure, the valves 179 and 184 controlling the application and exhaust of superatmospheric pressure to the dynamometer 80 are closed. Likewise, the valve 189 is closed to prevent air from entering the system through the air check valve 188. The valves 196 and 200 are also closed to preclude the blower 197 from drawing brake liquid out of the heat exchanger 86 or the conduits associated therewith. Normally, of course, all of the brake liquid will have been withdrawn from the dynamometer 80 by the pump 97 and returned to the tank 100 before the blower 197 is started. A manually operable valve 201 connected in the conduit 195 is opened after the valves 189, 196 and 200 have been closed in order to establish communication between the suction blower 197 and the interior of the dynamometer 80. The gauge 185 is adapted to indicate the degree of vacuum present in the housing 81.

As the degree of vacuum within the dynamometer 80 increases, the density of the air decreases with a corresponding decrease in the "windage" load absorption capacity of said dynamometer. Hence, the extent of heating of such air as is present in the dynamometer is correspondingly reduced.

It may be desirable, under certain load conditions, to employ air under superatmospheric pressure to absorb light loads for periods of time which would result in undesirable and excessive heating of the air under superatmospheric pressure within the dynamometer. Numerous expedients may be employed for effecting cooling of such air. One of such expedients may reside in passing the air through the heat exchanger coil 86 to effect cooling thereof. In order to permit this, all of the brake liquid in the heat exchanger coil 86 is first drained therefrom and returned to the storage tank 100 through a conduit 205ᵃ having a manually operable valve 206ᵃ connected therein. The valves 95, 184 and 201 are maintained closed and the compressed air under superatmospheric pressure is admitted for circulation through the dynamometer and heat exchanger coil 86 by opening of the valve 179, until the desired pressure is attained, as indicated by the gauge 185. Air will then be forced out of the outlet 84 of the dynamometer housing 81 and into the conduit 85 by the action of the rotor 82, then passed through the heat exchanger coil 86, and be returned through the conduit 87ᵃ, the valves 196 and 200 in said conduits, of course, being open at such time. The air will be cooled while passing through the heat exchanger coil by virtue of the coolant admitted into the heat exchanger casing 88 through the conduit 89. The use of the heat exchanger coil 86 to cool the air under superatmospheric pressure also makes it possible to accurately control the resistance offered by such air when used alone to absorb power, without danger of producing undesirable dynamometer action, which might otherwise occur from an increase in the pressure of the air that would result from expansion due to heating thereof. Thus, the cooling of the air makes it possible to maintain a substantially constant load on the dynamometer through the use of a gaseous medium alone under superatmospheric pressure. The relief valve 156ᵃ, however, would automatically function as a safety device to relieve excess air pressure, if any should be developed because of improper heat exchange operation, etc.

Fig. 6 diagrammatically illustrates a fluid coupling of the type adapted to have the volume of fluid therein varied in order to vary the torque transmitting capacity of the coupling. This coupling includes an impeller member 205 mounted upon a drive shaft 206, and a driven member or runner 207 disposed within the impeller member 205 and secured to a driven shaft 208. The impeller 205 is provided with vanes 209 and the runner 207 is provided with vanes 210 arranged in confronting relation to the vanes 209. A stationary sleeve 211 surrounds the shaft 208 and is provided with a port 212 which communicates with one end of a tube 213 disposed between the runner 207 and a portion of the impeller 205. The opposite end of the tube 213 is open and disposed adjacent the outer periphery of the runner 207 in order to adapt the same to scoop liquid from the coupling when it is desired to unload the same. A conduit 214 is connected with the port 212 for introducing liquid into and exhausting liquid from the fluid coupling. The stationary sleeve 211 is provided with a second port 215 which communicates at 216 with the interior of the impeller 205. A compressed air supply and exhaust conduit 217 communicates with the other end of the port 215.

It will be apparent that upon the introduction of liquid into the fluid coupling through the conduit 214, the same will resist relative rotation between the impeller 205 and the runner 207 so that the impeller 205 will be coupled by the fluid in driving relation with the runner 207. Any instability, undue slipping, or critical load points of the coupling can be overcome by introducing compressed air into the fluid coupling through the conduit 217, the effect being the same as that described hereinbefore in connection with hydraulic brakes or dynamometers. Any suitable means (not shown) can be associated with the conduits 214 and 217 to vary the volume of liquid in the fluid coupling and to vary the air pressure as desired.

While various control apparatus, both manual and automatic, have been illustrated and described herein for the purpose of increasing the normal range of usefulness and utility of a hydraulic brake, dynamometer, fluid coupling, etc., beyond that which it would normally have, it will be understood that various changes may be made in the details of construction of the apparatus and in the arrangement of the parts thereof for effecting various functions or combinations of functions, without departing from the spirit of the invention or the scope of the annexed claims.

I claim:

1. A hydraulic dynamometer for testing a prime mover developing power less than that of the normal low-load power absorption capacity of said dynamometer, comprising: a vaned housing member; a rotatable vaned rotor member in said housing member cooperating with said housing member to provide a working circuit for brake liquid; means for admitting brake liquid into and for draining brake liquid from said working circuit and housing member to vary the volume of liquid therein; and suction means for withdrawing air from said housing member while said housing member is devoid of liquid to thereby produce a subatmospheric pressure condition in said working circuit to decrease the normal windage resistance in said housing member and thus lower the normal low-load power absorption capacity of said dynamometer.

2. A hydrodynamic brake device, comprising: a vaned stator housing member; a rotatable vaned member in said housing member; means for introducing a liquid into said housing member to retard relative rotation of said members; means for draining liquid from said housing member to waste to vary the power absorption capacity of the device; means for introducing compressed air into said housing member while said liquid is confined therein; and means for automatically varying the pressure of the compressed air on the confined liquid in said housing member in accordance with changes in pressure in said liquid developed by said liquid under load.

3. Apparatus for absorbing the power of a rotating element, comprising: a hydraulic brake unit including a vaned housing; a shaft rotatably mounted in said housing and adapted to be connected with said rotating element; and a vaned rotor in said housing secured to said shaft; means for admitting liquid into and exhausting liquid from said housing at will; and automatic means responsive to pressure conditions in said housing for admitting compressed air into and exhausting said air from said housing.

4. Dynamometer apparatus, comprising: a vaned housing; a vaned rotor rotatably mounted in said housing; means for admitting liquid into said housing to increase the load absorption capacity of said dynamometer; and automatic means responsive to pressure conditions in said housing for admitting compressed air into said housing to increase the air pressure therein in proportion to the increase in the pressure developed in said liquid by the rotation of said rotor.

5. Hydrodynamic apparatus, comprising: a vaned housing; a vaned rotor rotatably mounted in said housing and cooperating therewith to provide a working circuit for liquid; means for admitting liquid into said housing to increase the resistance to rotation of said rotor relative to said housing; means for admitting compressed air into said housing while retaining said liquid in said working circuit to increase the air pressure in said housing to counteract the pressure developed in said liquid by the rotation of said rotor and to assure proper flow of said liquid in said working circuit; means for discharging liquid from said housing to waste; and means independent of said last-mentioned means for automatically exhausting said compressed air from said housing to reduce the air pressure in said housing in predetermined proportion to the reduction in the volume of liquid in said housing as the volume of liquid in the housing is reduced.

6. Dynamometer apparatus, comprising: a vaned housing; a vaned rotor rotatably mounted in said housing; means for admitting liquid into said housing to increase the load absorption capacity of said dynamometer; means responsive to pressure conditions in said housing for automatically admitting compressed air into said housing to increase the air pressure therein in proportion to the increase in the pressure developed in said liquid by the rotation of said rotor; means for withdrawing liquid from said housing to reduce the load absorption capacity of said dynamometer; and means responsive to pressure conditions in said housing for automatically reducing the air pressure in said housing in proportion to the reduction in the pressure developed in the liquid in said housing.

7. A hydrodynamic device, comprising: a vaned housing member; a vaned rotatable member in said housing member; a conduit connected with said housing member for introducing liquid thereinto; a reversible pump connected with said conduit; means for driving said pump; a valve connected in said conduit between said pump and housing member, said valve being arranged to open automatically under hydraulic pressure developed by said pump during the introduction of liquid into said housing member to load the same; and means for holding said valve open when said pump is operated to withdraw liquid from said housing member to effect unloading of the same.

8. A hydrodynamic device, comprising: a vaned housing member; a rotatable vaned member in said housing member; a conduit connected with said housing member for introducing liquid thereinto; a reversible pump connected with said conduit; a reversible electric motor arranged to drive said pump in opposite directions; a reversing switch connected in circuit with said motor to control the operation thereof; and a solenoid operated valve connected in said conduit between said pump and housing member, said solenoid operated valve being constructed to open automatically under hydraulic pressure developed by said pump during the introducing of liquid into said housing member to load the same and being connected in circuit with said reversing switch so as to be positively held open upon energization of its solenoid when said switch is actuated to reverse said motor and the pump is reversed to withdraw liquid from said housing member to effect unloading of the same.

9. A hydrodynamic device and control means therefor, comprising: a vaned housing member; a vaned rotatable member in said housing member; means for introducing a liquid into said housing member including a pump and conduit means having a one-way check valve therein arranged between said pump and said housing member; a conduit arranged to by-pass said check valve and having an orifice therein restricting flow therethrough; a fluid pressure responsive air bleeder valve having a pressure chamber communicating with said conduit means; and means connecting the inlet side of said air bleeder valve with the interior of said housing member, whereby when said pump is operated to withdraw liquid from said housing member the return liquid flow will be restricted by said orifice and a vacuum condition will be created in said conduit means to effect opening of said air bleeder valve to vent said housing member to the atmosphere.

10. A hydrodynamic device and control means therefor, comprising: a vaned housing member; a vaned rotor member in said housing member; means for introducing a liquid into said housing member for retarding rotation of said rotor member relative to said housing member, said means including conduit means having one end thereof communicating with said housing; a pump connected with said conduit means arranged to introduce and withdraw liquid from said housing means; a differential pressure-operated valve having the inlet thereof communicating with a source of supply of compressed air and having its outlet communicating with said conduit means, said pressure differential operated valve also having a pressure chamber; and means connecting said pressure chamber with an air vent opening in said housing, whereby when the pressure of the liquid in said conduit means exceeds the air pressure in said housing by a predetermined amount, said pressure differential operated valve is caused to open to admit compressed air into said conduit means.

11. A hydrodynamic device and control means therefor, comprising: a vaned housing member; a vaned rotor member in said housing member; means for introducing a liquid into said housing member for retarding rotation of said rotor member relative to said housing member, said means including conduit means having one end thereof communicating with said housing and a pump connected with said conduit means arranged to introduce and withdraw liquid from said conduit means; a one-way check valve connected in said conduit means between said pump and said housing member and arranged to permit flow only in a direction toward said housing member; a conduit arranged to by-pass liquid around said check valve and having an orifice therein to restrict flow through said by-pass conduit; a differential pressure-operated valve having the inlet side thereof communicating with a source of supply of compressed air and having its outlet communicating with said conduit means, said pressure differential operated valve also having a pressure chamber; a conduit connecting said pressure chamber with an air vent opening in said housing, whereby when the pressure of the liquid in said conduit means exceeds the air pressure in said housing by a predetermined amount, said pressure differential operated valve is caused to open to admit compressed air into said conduit means; a fluid pressure-responsive air bleeder valve having a pressure chamber communicating with said conduit means; and means connecting the inlet side of said air bleeder valve with the interior of said housing member, whereby when said pump is operated to withdraw liquid from said housing member the return liquid flow will be restricted by said orifice and a vacuum condition will be created in said conduit means to effect opening of said air bleeder valve to vent said housing member to the atmosphere.

12. The method of decreasing the windage load of a hydrodynamic power absorption device of the vaned housing and vaned rotor type which consists in the steps of: removing substantially all brake liquid from the housing of such device; and evacuating air from the housing of such device to provide a subatmospheric pressure condition therein to thereby decrease the resistance to rotation of the rotor thereof.

13. The method of stabilizing a hydrodynamic brake device which is unstable under certain light load conditions, comprising the steps of: introducing sufficient liquid into the housing of such device to absorb the load under a given speed condition even though the device is rendered unstable thereby; and then additionally introducing compressed air under sufficient super-atmospheric pressure into said housing while retaining said liquid therein to produce stability of said device.

14. The method of loading a hydrodynamic brake device, including a housing and elements within said housing adapted to be hydraulically coupled and provide a working circuit for brake liquid, comprising the steps of: gradually introducing liquid into the working circuit of said housing to partially fill the same and establish a hydraulic resistance between said elements; and gradually introducing compressed air into the working circuit of said housing, while retaining said liquid in said working circuit, to increase the air pressure therein to offset the pressure developed in the liquid in the housing as the pressure of said liquid is increased under load.

15. The method of unloading a hydrodynamic brake device, including a housing containing brake liquid and air introduced under super-atmospheric pressure, and elements within said housing that are adapted to be hydraulically coupled and provide a working circuit, comprising the steps of: gradually withdrawing liquid from the working circuit of said housing; and gradually and independently relieving the superatmospheric air pressure in said housing to reduce said air pressure in the working circuit in proportion to the reduction in the volume of liquid in the working circuit of the housing as said volume of liquid is reduced.

16. The method of controlling a hydraulic dynamometer including a vaned rotor and a vaned stator providing a working circuit for brake liquid, comprising the steps of: introducing liquid into the working circuit of the stator to absorb a torque load applied to the rotor; increasing said torque load; and progressively introducing compressed air into the working circuit, while preventing said liquid from escaping from said working circuit, to increase the air pressure therein commensurate with the increased pressure developed in said liquid by rotation of said rotor under said increased torque.

17. The method of testing a prime mover developing low horsepower by a hydraulic brake unit of such comparatively large absorption capacity as to normally be incapable of satisfactorily testing said prime mover due to the small volume of brake liquid required, which comprises the steps of: introducing said small volume of brake liquid into the brake housing; and introducing air under pressure into said housing and maintaining sufficient superatmospheric air pressure upon the brake liquid in said brake housing while retaining said brake liquid in said housing to maintain said brake liquid in its intended working circuit while the rotor is being rotated, whereby to maintain a substantially uniform load on the prime mover being tested.

18. The method of testing a prime mover developing low horsepower by a hydraulic brake unit of such comparatively large absorption capacity as to normally be incapable of satisfactorily testing said prime mover due to the small volume of brake liquid required, which comprises the steps of: introducing said small volume of brake liquid into the brake housing; and introducing air under pressure into said housing and maintaining an air pressure of about 5 to 40 lbs. per square inch gauge in said housing while retaining the brake liquid in said housing to maintain the brake unit stable.

19. The method of testing a prime mover developing low horsepower by a hydraulic brake unit of such comparatively large absorption capacity as to normally be incapable of satisfactorily testing said prime mover due to the small volume of brake liquid required, which comprises the steps of: introducing said small volume of brake liquid into the brake housing; and introducing air under pressure into said housing and maintaining an air pressure of about 15 lbs. per square inch gauge in said housing while retaining the brake liquid in said housing to maintain the brake unit stable.

20. A hydrodynamic brake device, comprising: a vaned housing member adapted to contain brake liquid; a rotatable vaned rotor member in said housing member cooperating with said housing member to provide a working circuit for power absorption brake liquid; means for draining said brake liquid from said working circuit, said vanes offering a given windage resistance when said working circuit is devoid of liquid; and a suction blower connected with said housing member for withdrawing air from said working circuit to produce a subatmospheric pressure condition in said working circuit while said working circuit is devoid of brake liquid to thereby decrease the windage resistance of said working circuit.

21. Dynamometer apparatus, comprising: a vaned housing; a vaned rotor rotatably mounted in said housing; means for admitting liquid into said housing to increase the load absorption capacity of said dynamometer; automatic means responsive to pressure conditions in said housing for admitting compressed air into said housing to increase the air pressure therein in proportion to the increase in the pressure developed in said liquid by the rotation of said rotor; and means responsive to pressure conditions in said housing for automatically relieving any excess air pressure that may occur in said housing.

22. Dynamometer apparatus, comprising: a vaned stator housing; a vaned rotor rotatably mounted in said housing; means for admitting liquid into said housing to increase the load absorption capacity of said dynamometer; and means for admitting compressed air into said housing including a valve element operable in accordance with the pressure differential between the pressure of the liquid in said housing and the pressure of the air in said housing.

23. A hydraulic dynamometer, comprising: a stator housing; a rotor in said housing; an inlet valve for introducing brake liquid into said housing; a drain valve for draining said brake liquid from said housing; means normally operable independently of said drain valve for introducing compressed air into said housing to stabilize the operation of said dynamometer when necessary and while said drain valve is closed; an air bleed valve normally operable independently of said brake liquid inlet valve for releasing the compressed air from said housing; and an air expansion chamber arranged between said stator housing and the inlet side of said air bleed valve for effecting separation of brake liquid from the air before the air enters said air bleed valve.

24. Dynamometer apparatus, comprising: a vaned stator housing; a vaned rotor rotatably mounted in said housing; means for admitting liquid into said housing to increase the load absorption capacity of said dynamometer; means for admitting compressed air into said housing to increase the air pressure therein; means for withdrawing liquid from said housing to reduce the load absorption capacity of said dynamometer; and means responsive to pressure conditions in said housing for automatically reducing the air pressure in said housing in proportion to the reduction in the pressure developed in the liquid in said housing.

25. Dynamometer apparatus, comprising: a vaned stator housing; a vaned rotor rotatably mounted in said housing; means for admitting liquid into said housing to increase the load absorption capacity of said dynamometer; means for admitting compressed air into said housing including a valve element operable in accordance with the pressure differential between the pressure of the liquid in said housing and the pressure of the air in said housing; means for withdrawing liquid from said housing to reduce the load absorption capacity of said dynamometer; and an air bleed valve connected with said housing responsive to liquid and air pressure conditions in said housing for automatically reducing the air pressure in said housing in proportion to the reduction in the pressure developed in the liquid in said housing.

26. Dynamometer apparatus as defined in claim 25, including an air expansion chamber between said housing and the inlet of said air bleed valve for separating liquid from the air bled through said valve, whereby the volume of liquid in said housing can be maintained constant.

27. A hydraulic dynamometer and control means therefor, comprising: a housing member; a rotor member in said housing member; means for admitting liquid into, and for withdrawing liquid from, said housing member to vary the load absorption capacity of said dynamometer; a differential pressure operated valve having the inlet thereof communicating with a source of supply of compressed air; a first conduit connecting the outlet side of said valve with said housing; diaphragm means in said valve having one side thereof subject to the pressure of the liquid in said housing and arranged to control the flow of compressed air through said valve, said valve also having an air pressure chamber; a second conduit connecting said air pressure chamber with an air vent opening in said housing member; a second diaphragm in said valve subject to the air pressure in said air chamber and arranged to transmit said pressure to the other side of said first-mentioned diaphragm, whereby when the pressure of the liquid in said outlet of said valve exceeds the air pressure in said pressure chamber, said valve is caused to open to admit compressed air into said housing; an air bleed valve having an inlet and an outlet; conduit means connecting said inlet of said air bleed valve with said second conduit, said air bleed valve having a pressure chamber and a diaphragm controlling flow therethrough and subject to the pressure in said last-mentioned pressure chamber; and a conduit connecting said pressure chamber of said air bleed valve with said first conduit, whereby said air bleed valve will automatically open to bleed air from said housing in proportion to the reduction in the pressure of the liquid in said housing.

EDWIN L. CLINE.

References Cited in the file of this patent

UNITED STATES PATENTS

| Number | Name | Date |
|---|---|---|
| 1,454,887 | Giovannini | May 15, 1923 |
| 1,881,083 | Kiep | Oct. 4, 1932 |
| 1,885,580 | Bradbury | Nov. 1, 1932 |
| 1,992,910 | De la Mater | Feb. 26, 1935 |
| 2,035,576 | Taylor | Mar. 31, 1936 |
| 2,116,992 | Weaver | May 10, 1938 |
| 2,162,541 | Walker | June 13, 1939 |
| 2,388,571 | Popper | Nov. 6, 1945 |
| 2,428,005 | Bennett | Sept. 30, 1947 |
| 2,441,855 | Trumpler | May 18, 1948 |